(12) United States Patent
Moreau

(10) Patent No.: US 7,849,819 B2
(45) Date of Patent: Dec. 14, 2010

(54) BRISKET TUBE HANGER FOR COW STALL ASSEMBLY

(75) Inventor: Joseph R. Moreau, Clinton, NY (US)

(73) Assignee: Norbco, Inc., Westmoreland, NY (US)

( * ) Notice: Subject to any disclaimer, the term of this patent is extended or adjusted under 35 U.S.C. 154(b) by 325 days.

(21) Appl. No.: 12/020,081

(22) Filed: Jan. 25, 2008

(65) Prior Publication Data

US 2009/0188436 A1   Jul. 30, 2009

(51) Int. Cl.
   *A01K 1/00*   (2006.01)
   *F16L 3/08*   (2006.01)
(52) U.S. Cl. .......................... 119/523; 248/70
(58) Field of Classification Search ............ 119/516, 119/523, 519, 520, 522; 248/70, 223.41, 248/225.11
   See application file for complete search history.

(56) References Cited

U.S. PATENT DOCUMENTS

| 858,140 | A | * | 6/1907 | Beaton | 248/57 |
| 4,141,524 | A | * | 2/1979 | Corvese, Jr. | 248/70 |
| 4,993,670 | A | * | 2/1991 | Tesar | 248/68.1 |
| 5,060,891 | A | * | 10/1991 | Nagy et al. | 248/56 |
| 6,925,962 | B2 | * | 8/2005 | Moreau | 119/516 |
| 7,469,658 | B2 | * | 12/2008 | Moreau | 119/516 |
| 2005/0263092 | A1 | * | 12/2005 | Moreau | 119/516 |

FOREIGN PATENT DOCUMENTS

EP   521587 A2 *   1/1993

* cited by examiner

*Primary Examiner*—Rob Swiatek
*Assistant Examiner*—Kristen C Hayes
(74) *Attorney, Agent, or Firm*—Bernhard P. Molldrem, Jr.

(57) ABSTRACT

A hanger for a brisket tube or brisket rail employs an L-shaped bracket member formed of a slotted vertical plate with a horizontal top mounting flange. A clamp member, e.g., an omega clamp, secures the top mounting flange to a lower rail of a stall divider. A brisket pipe clamp attaches to the bracket and has an arcuate portion that captures the brisket pipe. The brisket pipe clamp is formed of a slide plate with flanged edges, a partly arcuate retaining arm that extends proximally from the slide plate, and a stub or post that extends distally through the slot in the vertical plate. This can be a threaded post so that the slide plate can be secured to the vertical plate with a nut. The slot permits limited vertical adjustment.

11 Claims, 3 Drawing Sheets

BRISKET TUBE HANGER FOR COW STALL ASSEMBLY

BACKGROUND OF THE INVENTION

This invention relates in general to the animal stalls, in particular stalls for dairy animals, and is more particularly directed to an improved arrangement of cow stall assemblies of the type in which dividers are installed forming double rows of cow stalls, especially suited for freestall dairy barns. In particular, the invention is related to a system in which a brisket tube, i.e., a plastic pipe for gently retaining the cow in one side of a double stall, is supported on lower rails of the cow stall dividers above the floor of the stall.

Freestall dairy barns, also known as loose housing, have become an attractive option for dairy farmers who want to maintain and manage a large dairy herd. The advantages of the freestall housing system include reduction of bedding per cow, less space per cow, ease of manure removal, reduced udder washing time before milking, higher milk quality, and less frequent udder injury. The large cattle population housed within the barn requires the design of the barn to pay attention to the areas where the cows rest, i.e., the free stalls.

As a matter of background, general guidelines for constructing and employing freestall barns for a dairy herd are found in Robert E. Graves, Guideline for Planning Dairy Freestall Barns, Northeast Regional Agricultural Engineering Service Cooperative Extension, Ithaca N.Y., 1995. Other useful background information can be found in Moeller et al., Free-Stall Loose Housing for Dairy Cattle, ID-63, Purdue University Cooperative Extension Service; Hammond, Dairy Free Stall Design, University of Georgia College of Agricultural and Environmental Services Cooperative Extension Service; and Chastain et al., Dairy Lighting System for Free Stall Barns and Milking Centers, Pub. AEU-12, University of Minnesota Extension Service, Department of Biosystems and Agricultural Engineering, August 1966.

A number of free stall designs have employed tubular, loop-like stall dividers to minimize the need for structural elements at the front and sides of the animals, to give the animal increased freedom of movement when standing or lying in the stall, and to facilitate rising from a lying position. An example of a cow stall assembly in which free stall dividers support a horizontal brisket tube is described in Moreau U.S. Pat. No. 6,925,962. Other cow stall divider designs for free stall barns include an example described in Albers, Jr. U.S. Pat. No. 6,026,766. Another proposed free stall divider system is discussed in Rudolph U.S. Pat. No. 6,230,658 and another still is discussed in Hatfield U.S. Pat. No. 6,318,297.

It is advantageous to have an open area for the first thirty-six inches or so above the floor at the front of each cow stall to give the animal freedom of movement to assist her in lying and standing. It has been observed that overhead structural elements that are lower than about 36 inches over the floor can get in the way of natural motion of the cow. For example, when cows lie down and when they rise from a lying position, the cows will lunge forward somewhat. If there are obstructions present, a cow may injure her head or foreleg on them. Accordingly, there are advantages in overall cow comfort and safety if a lower support beam can be omitted. On the other hand, a horizontal rail or beam, placed above that level, could serve to support a number of stall dividers, providing economy of construction and sufficient strength to withstand the normal use expected by large animals.

At the same time, it is advantageous to install a brisket rail above the floor of the cow stall near the head or inner end. This is intended as a mild restraint to keep the cow from walking through the pair of cow stalls, but will permit the cow to step over it when she lunges as she rises from a lying position to a standing position. The brisket rail can be suspended from the bottom rails of the stall dividers. The brisket rail is favorably formed as a polyethylene plastic pipe, with a nominal diameter of five to six inches. Hangers can be fitted onto each of the lower rails of the dividers, with a J-bolt or a U-bolt to secure the brisket pipe or rail. The hanger should permit at least some vertical adjustment of the rail. The plastic pipe is advantageous in this application as it has good linear rigidity, and provides some additional structural support for the dividers, but is yielding enough that is does not injure the cow's forelegs when she steps against it or kicks it.

The brackets or hangers used for this purpose tend to loosen over time, as the brisket tube or pipe is frequently bumped and kicked by the cows, and so an improved hanger has been sought that provides good support for the brisket tube, is simple to install and maintain, and does not twist and loosen.

OBJECTS AND SUMMARY OF THE INVENTION

Accordingly, it is an object of this invention to provide a cow stall arrangement for a freestall dairy barn with brisket rails and associated brisket rail hangers which overcome the drawbacks of the prior art.

It is another object to provide brisket rail hangers that can be easily field-installed on freestall stall dividers.

It is a further object to design a brisket rail hanger that does not weaken or loosen over time, and can withstand being kicked or bumped by large dairy animals.

In accordance with an aspect of this invention, a cow stall assembly, of the type that is formed of a series of tubular loop stall dividers, which have an upper horizontal rail and a lower horizontal rail, are mounted on support posts or stanchions.

The brisket rails or brisket pipes are supported on the lower rails of the dividers, with the rail or pipe extending in the transverse direction over the length of the series of stalls. These help restrain the cows in the stalls, and also provide some of the structural strength of the stall system.

In a preferred embodiment, a series of hangers is provided for the brisket tube for a cow stall assembly, wherein the brisket tube takes the form of a generally cylindrical plastic pipe. Each hanger has a bracket member formed of a vertical plate member with vertical edges spaced apart a predetermined width. A vertical slot is formed in the plate member, and there is horizontal mounting flange at an upper edge of the plate member. A clamp member is attached onto the horizontal mounting flange of bracket member to secure it onto an associated one of the stall divider horizontal lower rail members. A brisket pipe clamp then attaches onto the bracket to hold the brisket pipe in place. The brisket pipe clamp is formed of a slide plate member and a J-shaped or U-shaped retaining arm. The slide plate member is in the form of a flat plate with a pair of flanges formed at its vertical edges. The partly arcuate retaining arm is affixed onto, and extends from the proximal side of the slide plate member and has a curved portion that is dimensioned to capture said brisket tube inside its arc. There is a stub extending distally from the slide plate member through the vertical slot of the bracket member. The slide plate member is then secured onto to said bracket member, to support the brisket pipe above the floor of the cow stall.

In a preferred embodiment the bracket member is in the form of an L-bracket, and in a full size version, intended for mature cows, the bracket member has a height of about ten inches. In a version intended for heifers, the bracket member has a height of about eight inches.

The clamp member that holds the top flange of the hanger onto the lower rail of the divider can take the form of an omega clamp, which has a curved center portion and flat end portions. The flat end portions can then be secured to the top flange of the hanger using bolts and nuts, with the bolts passing through bolt holes provided in the omega clamp and top flange.

In a preferred embodiment, the brisket pipe clamp retaining arm has curved portion with a radius of substantially three inches and this portion extends over an arc of substantially 180 degrees. The retaining arm has an initial straight portion that extends from the slide plate substantially three inches to one end of the curved portion, and an end return straight portion that extends substantially three inches from the other end of the curved portion. In this embodiment, the initial straight portion and said end return straight portion are substantially parallel with one another. In the described embodiment, the retaining arm is formed of a round rod, but in other possible embodiments the retaining arm, or portions of it, could be formed of a plate bent into the appropriate shape, or could be formed of members of a different profile.

The stub can comprise a threaded post, with a nut being threaded to mate with threads of the stub to serve as the means for securing the slide plate member to the bracket member. Other attachment means are possible.

Preferably, the slot has a slot length of substantially four inches. This gives the hanger about four inches of vertical play in installing the brisket pipe.

The above and many other features, objects, and advantages of this invention will become apparent from the ensuing description of a preferred embodiment, which is to be read in connection with the accompanying Drawing.

DETAILED DESCRIPTION OF A PREFERRED EMBODIMENT

The prior U.S. Pat. No. 6,216,633 is incorporated herein by reference for showing the salient details of a freestall double-row cow stall assembly, of the type in which the brisket tube hangers of this invention may be employed. The freestall barn may have a floor of concrete, earth, sand, or other material, and the freestall divers may be supported on posts planted in the floor, or may be suspended from above. In these freestall assemblies, there is a space provided in the front of each stall to permit the cow some freedom of movement in helping her raise herself from a down position to a standing position. However, to discourage the cow from simply walking through the stall, a brisket bar is positioned a few inches off the floor as a mild restraint.

The cow stalls are defined by a series of stall dividers which may favorably take the form of tubular loop-type dividers. These can be formed from a single tubular rail bent into a loop having a generally horizontal upper rail and a generally horizontal lower rail. The stall dividers can be of various shapes and dimensions, and the rails may be of round, square or other cross section.

Neck rails such as tubes or pipes may be attached onto the upper rails of the stall dividers, extending horizontally and transversely. The neck rails serve to help position the cow when standing, and also furnish additional structural strength to the cow stall assembly.

Figure 1:
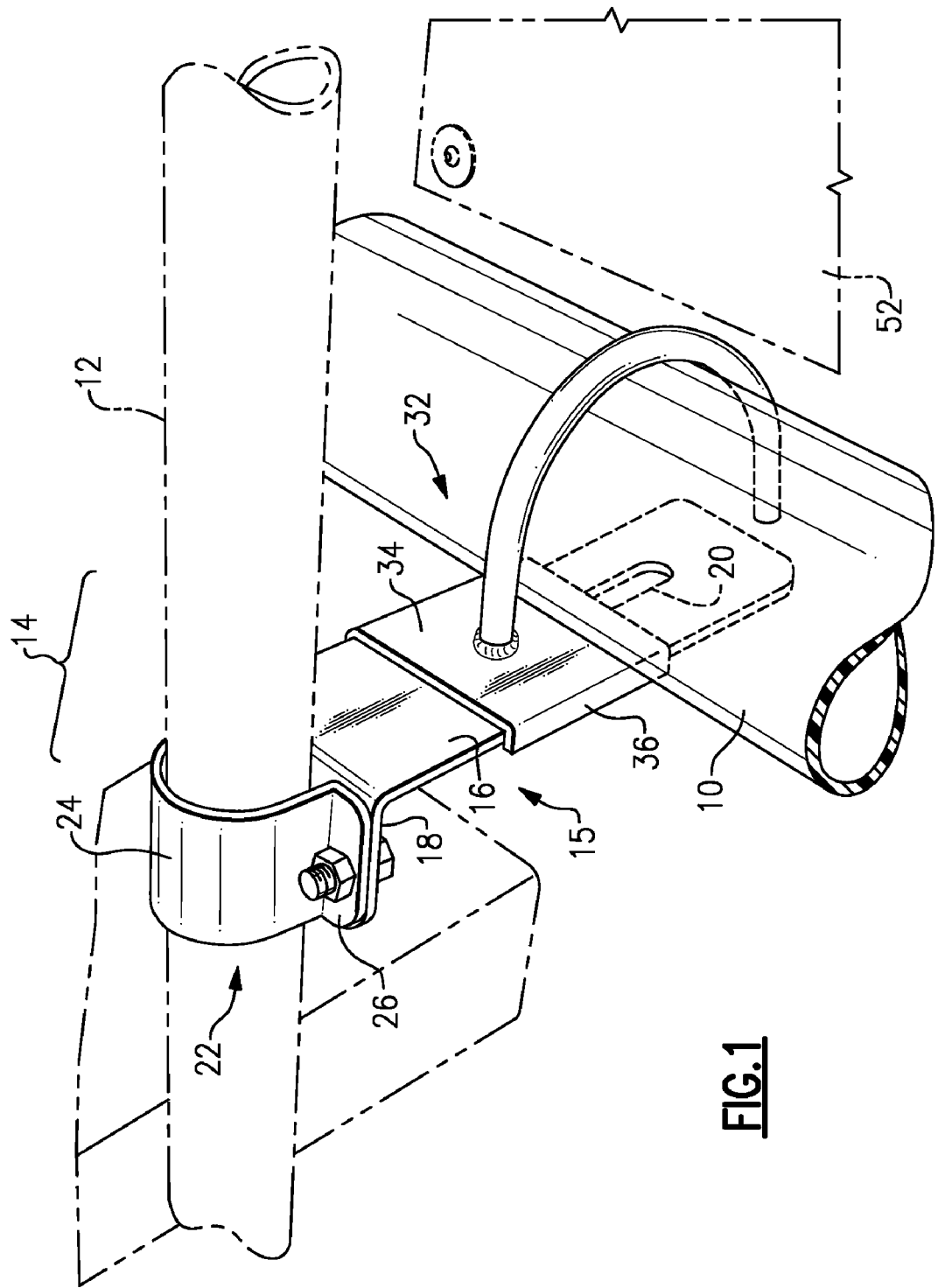
FIG. 1 is a perspective view of a portion of the cow stall assembly showing the brisket tube hanger according to one embodiment of this invention.
Figures 2, 3:
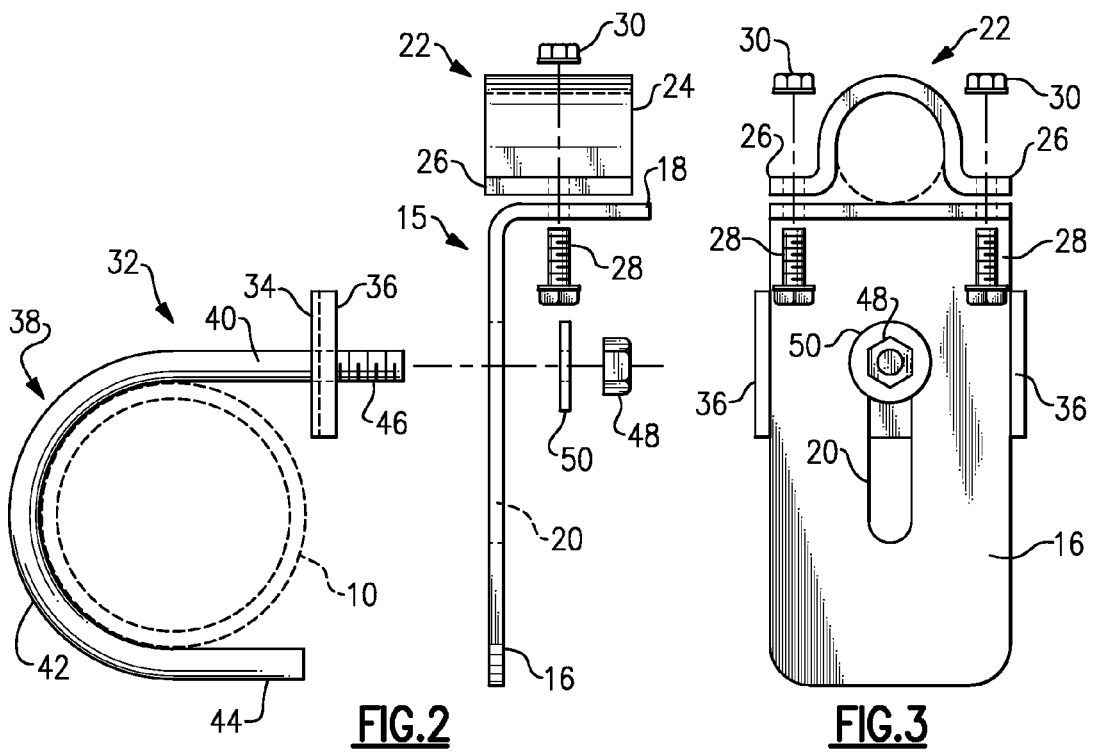
FIG. 2 is a side elevational assembly view of a the brisket tube hanger of this embodiment.
FIG. 3 is a rear elevational assembly view of this embodiment.

As shown in FIG. 1, a brisket rail 10, in the form of a polyethylene plastic pipe, is attached onto a bottom rails 12 of a respective stall divider. Here the brisket rail 10 favorably has a nominal diameter of five to six inches. There are hangers 14 fitted onto each of the bottom rails 12, one of which is shown here. Each hanger 14 has hanger bracket 15 that is generally L-shaped, formed of a vertical plate member 16 and horizontal top flange 18. The vertical plate member has straight, vertical sides that define a predetermined width, e.g., two to four inches, and there is a vertical slot 20 formed in the plate member 16. An omega clamp 22 secures the top flange 18 to the rail 12. Here the omega clamp has an arcuate center portion 24 and a pair of flat end portions 26. The flat end portions are bolted to the flange 18 using bolts 28 that pass through bolt holes provided in these members. These are secured by nuts 30. These elements are also shown in more detail in FIGS. 2 and 3.

Figure 6:
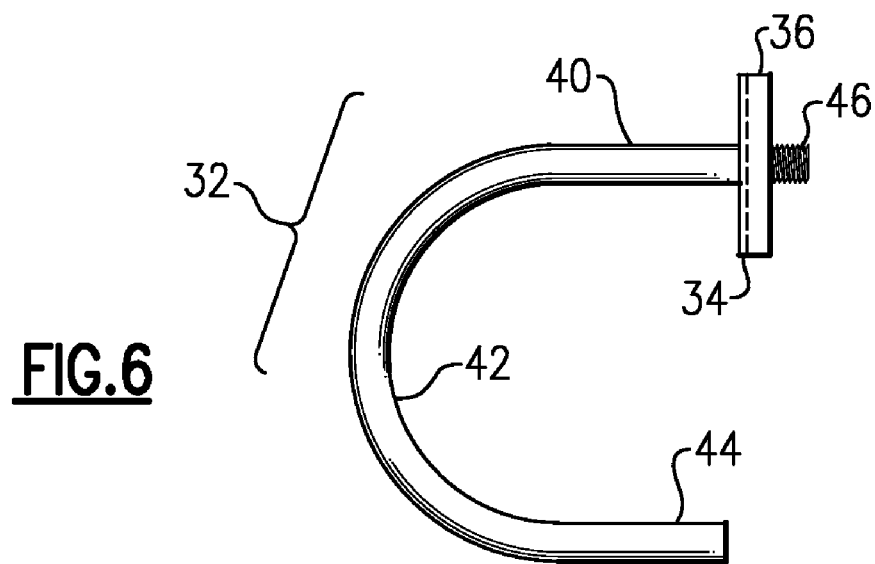
FIG. 6 is a side elevational view of the slide plate member of these embodiments.
Figure 7:
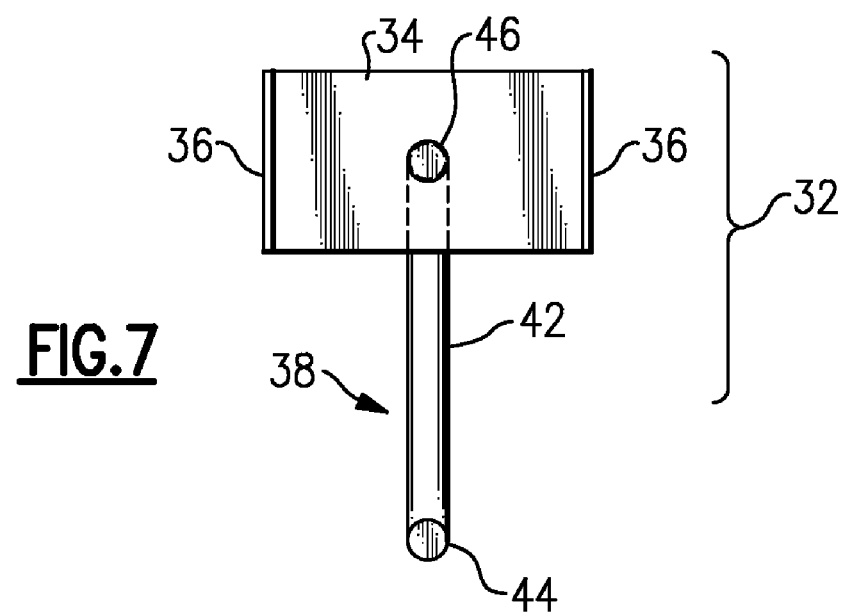
FIG. 7 is a rear elevational view thereof.

A brisket pipe clamp member 32 (see also FIGS. 6 and 7) is fastened to the bracket member 15 to hold the pipe 10 in place. The brisket pipe clamp member 32 has a slide plate member 34 that extends across the width of the plate member 16, and has a pair of side flanges 36 that project in a distal direction and extend along the side edges of the vertical plate member 16. An arcuate retaining arm 38, which is seen as generally J-shaped or U-shaped, has a first, straight portion 40 that extends proximally out from the slide plate 34, then a second arcuate portion 42 that curves over an arc of 180 degrees, and a third straight return portion 44. The curved or arcuate portion 42 has a radius of curvature that generally matches the pipe 10, e.g., about three inches. Here, the return portion 44 ends at or near the plane of the slide plate 34.

A threaded post 46 extends in the distal direction, i.e., away from the pipe 10, and passes through the slot 20 in the hanger vertical plate 16. A nut 48 and washer 50 on the back side of the vertical plate 16 fit over the post 46 and tighten down to secure the slide plate in place on the vertical plate. In this embodiment, the bracket member 15 has a vertical height of about ten inches, and the slot 20 has a slot length of about four inches. This gives the clamp member 32 about four inches of vertical play during installation, so that the pipe 10 can be installed at a desired height above the floor of the cow stall. A cow stall mat 52 (FIG. 1) may be installed on the floor of the cow stall, and is shown here to illustrate generally a desired position of the pipe or tube 10 above the cow stall floor.

Figures 4, 5:
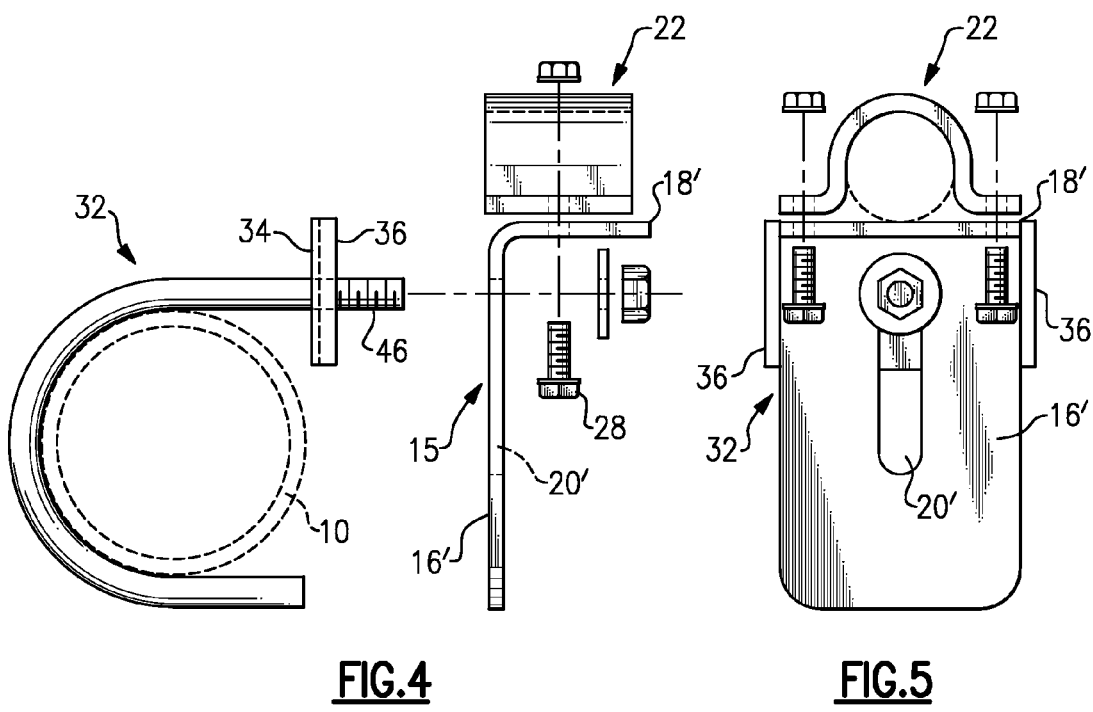
FIG. 4 is a side elevational assembly view of a the brisket tube hanger of another embodiment.
FIG. 5 is a rear elevational assembly view of this embodiment.

FIGS. 4 and 5 show a heifer version of the hanger arrangement of this invention. In this embodiment, the items that are identical with the first embodiment have the same reference numbers, and a detailed description of those elements will not be repeated. Those elements which are altered have the same reference number as previously, but primed. In this embodiment, as the cow stall dividers are mounted closer to the floor, there is not sufficient room for the ten-inch hangers 14 as described before. Accordingly, for the heifer embodiment, the L-shaped bracket 15' is shorter, such that the vertical plate member 16' has a height of only about eight inches. The vertical slot 20' is four inches long, as previously, but is formed nearer the top flange 18'. The slide plate 34 of the pipe clamp 32 can be positioned all the way to the top of the bracket 15' in this embodiment.

There are many other possible embodiments and implementations of this invention. In these embodiments, the post 46 serves both as the guide for sliding in the slot 20, and also as the means for receiving the nut 48 as a means for securing the slide plate in place. However, other clamp structure could be used, and plain stub or nipple could be used to penetrate the slot 20.

Here, the retaining arm 38 is formed of a round rod, but in other versions the arm could be formed of square or rectangular stock of or other suitable profile. The arm 38 is fused or affixed, i.e., welded, to the plate 34, and so it does not rotate or loosen on the plate. Also, the plate is kept in proper orientation by the two flanges 36 that lie along the vertical sides of the vertical plate 16, so that the slide plate 34 does not twist.

The rail 10, as aforesaid, is positioned near the floor as a mild restraint to the cow, but will permit the cow to step over when she lunges as she rises from a lying position. The plastic rail has good linear rigidity, and provides some additional structural support for the dividers, but is yielding enough that is does not injure the cow's forelegs when she steps against it or kicks it. The fixed, non-twisting orientation of the arcuate retaining arm 38 ensures that the rail 10 does not come loose from this normal bumping and kicking action of the cows in the stalls.

The hangers of this invention can be used for any of a variety of stall widths, which may be set depending on the size of the cows in the dairy herd.

While the brisket tube hangers of this invention have been described with reference to certain preferred embodiments, it should be understood that the invention is not to be limited only to those embodiments. Rather, many modifications and variations would present themselves to persons skilled in the art without departing from the scope and spirit of this invention, as defined in the appended claims.

I claim:

1. Hanger for a brisket tube for a cow stall assembly, of the type in which a plurality of spaced dividers each have at least a generally horizontal lower rail member spaced above a floor of the cow stall assembly, and wherein the brisket tube takes the form of a generally cylindrical pipe that extends along the cow stall assembly beneath the lower rail members of said dividers; said hanger comprising a bracket member formed of a vertical plate member with vertical edges spaced apart a predetermined width; and having a vertical slot formed therein; and having a horizontal mounting flange at an upper edge of the plate member;

a clamp member securing the horizontal mounting flange of said bracket member to an associated one of the horizontal lower rail members; and a brisket pipe clamp including a slide plate member having a pair of vertical edges spaced from one another at said predetermined width of said vertical plate member and having a pair of flanges formed at said vertical edges, the flanges projecting distally from said vertical edges of the slide plate member to capture the vertical plate member therebetween, so that the slide plate member is restrained from twisting on said vertical plate member; a partly arcuate retaining arm fused to said slide plate member and extending from a proximal side of the slide plate member and having a curved portion dimensioned to capture said brisket tube therein; a stub attached to said slide plate member and extending distally from said slide plate member through the vertical slot in said bracket member; and means for securing the slide plate member to said bracket member.

2. The hanger for a brisket tube according to claim 1 wherein said bracket member is in the form of an L-bracket.

3. The hanger for a brisket tube according to claim 2 wherein said bracket member has a height of substantially ten inches.

4. The hanger for a brisket tube according to claim 2 wherein said bracket member has a height of substantially eight inches.

5. The hanger for a brisket tube according to claim 1 wherein said clamp member comprises an omega clamp having a center curved portion and flat end portions.

6. The hanger for a brisket tube according to claim 1 wherein said brisket pipe clamp retaining arm has curved portion has a radius of substantially three inches and extends over an arc of substantially 180 degrees.

7. The hanger for a brisket tube according to claim 6 wherein said retaining arm has an initial straight portion extending from the slide plate substantially three inches to one end of said curved portion, and an end return straight portion extending substantially three inches from the other end of said curved portion.

8. The hanger for a brisket tube according to claim 7 wherein said initial straight portion and said end return straight portion are substantially parallel with one another.

9. The hanger for a brisket tube according to claim 1, wherein said retaining arm is substantially is substantially J-shaped.

10. The hanger for a brisket tube according to claim 1, wherein said stub comprises a threaded post and said means securing the slide plate member to said bracket member includes a nut threaded to mate with said threaded post.

11. The hanger for a brisket tube according to claim 1 wherein said slot extends for a slot length of substantially four inches.

* * * * *